(12) United States Patent
Larsson

(10) Patent No.: US 9,000,671 B2
(45) Date of Patent: Apr. 7, 2015

(54) METHOD OF IMPROVING VISIBILITY THROUGH A WINDOW

(75) Inventor: Annika Larsson, Goeteborg (SE)

(73) Assignee: Volvo Car Corporation, Gothenburg (SE)

(*) Notice: Subject to any disclaimer, the term of this patent is extended or adjusted under 35 U.S.C. 154(b) by 598 days.

(21) Appl. No.: 13/433,568

(22) Filed: Mar. 29, 2012

(65) Prior Publication Data

US 2012/0262062 A1    Oct. 18, 2012

(30) Foreign Application Priority Data

Apr. 13, 2011    (EP) ..................................... 11162243

(51) Int. Cl.
*B60Q 1/14* (2006.01)
*B60Q 1/26* (2006.01)
*B60Q 1/52* (2006.01)
*F21V 8/00* (2006.01)

(52) U.S. Cl.
CPC ........ *B60Q 1/268* (2013.01); *B60Q 1/52* (2013.01); *G02B 6/0068* (2013.01); *G02B 6/0095* (2013.01)

(58) Field of Classification Search
USPC ............................................................ 315/77
See application file for complete search history.

(56) References Cited

U.S. PATENT DOCUMENTS

| | | | |
|---|---|---|---|
| 2005/0189795 A1* | 9/2005 | Roessler | 296/215 |
| 2006/0066508 A1 | 3/2006 | Walck et al. | |
| 2007/0098969 A1 | 5/2007 | Ansems et al. | |
| 2007/0210906 A1 | 9/2007 | Knoll et al. | |
| 2008/0170403 A1* | 7/2008 | Gurevich | 362/319 |
| 2009/0039791 A1* | 2/2009 | Jones | 315/118 |
| 2009/0152449 A1* | 6/2009 | Goto | 250/214 R |
| 2009/0187343 A1 | 7/2009 | Koch-Groeber et al. | |
| 2011/0267833 A1 | 11/2011 | Verrat-Debailleul et al. | |

FOREIGN PATENT DOCUMENTS

| | | |
|---|---|---|
| DE | 10323320 A1 | 12/2004 |
| DE | 102004059742 A1 | 6/2006 |
| DE | 102009010623 A1 | 9/2010 |
| EP | 1580588 A1 | 9/2005 |
| EP | 1903359 A2 | 3/2008 |
| JP | 2006298061 A | 11/2006 |

OTHER PUBLICATIONS

European Patent Office, European Search Report for corresponding EP Patent Application No. 11 16 2243 mailed Sep. 23, 2011.

* cited by examiner

*Primary Examiner* — William Hernandez
(74) *Attorney, Agent, or Firm* — Brooks Kushman P.C.

(57) ABSTRACT

A method of improving visibility for a person viewing an environment through a window includes detecting a light condition in the environment and, in responses to nature of the detected light condition, activating an illumination system adjacent an edge of the window to direct light into the window. The light is of the proper intensity and a wavelength to improve visibility of the environment as viewed through the window. The light condition may be detected by an environmental sensor and the illumination system activated based on signals generated by the environmental sensor.

20 Claims, 1 Drawing Sheet

METHOD OF IMPROVING VISIBILITY THROUGH A WINDOW

CROSS-REFERENCE TO RELATED APPLICATIONS

This application claims foreign priority benefits under 35 U.S.C. §119(a)-(d) to EP 11162243.7, filed Apr. 13, 2011, the disclosure of which is incorporated in its entirety by reference herein.

TECHNICAL FIELD

The present disclosure relates to applying light to the edge of a window to thereby improve visibility for a person viewing objects through the window.

BACKGROUND

When looking through a window pane the perceived visual impression is influenced by the window pane through which the light rays pass in order to reach the eyes of the viewer. In addition, the window pane itself may be used as a medium on which information may be displayed to the viewer.

Document DE 20 2008 004 715 U1 discloses an arrangement for illuminating the edge of a vehicle side window, wherein the illumination system is fixedly attached to the lower edge of the side window pane and emits light into the window pane. According to the document, the window pane is easy to locate even in darkness. It is in particular possible to detect the upper edge of a frameless window, e.g. in a cabriolet. It also reduces the risk of leaving the vehicle with open windows when it is dark outside.

In a nautical environment it is known to use red and green discs in order to determine the color of a navigation mark. By looking through the discs one at the time, it may be distinguished if the color is red or green at a longer distance as compared to if only using the naked eye.

SUMMARY

In a disclosed embodiment, a method of improving visibility for a person viewing an environment through a window comprises detecting a light condition in the environment and, in responses to nature of the detected light condition, activating an illumination system adjacent an edge of the window. The illumination system is activated in a manner to direct light into the window, the light being of the proper intensity and a wavelength to improve visibility of the environment as viewed through the window.

The light condition may be detected by an environmental sensor and the illumination system activated based on signals generated by the environmental sensor.

The light condition may be detected by the person viewing the environment, the person then selecting an operating mode of the illumination system.

In another disclosed embodiment, a method of operating an edge-mounted illumination system for a window comprises detecting a light condition on an exterior side of the window and activating the illumination system to produce a color in the window that provides improved visibility for a person viewing objects through the window.

In another disclosed embodiment, a method of improving visibility for an occupant of a motor vehicle comprises detecting a light condition outside the vehicle and activating an illumination system adjacent an edge of a vehicle window to direct light into the window. The light is of an intensity and wavelength selected to produce a color in the window that improves visibility for the occupant when viewing objects through the window.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
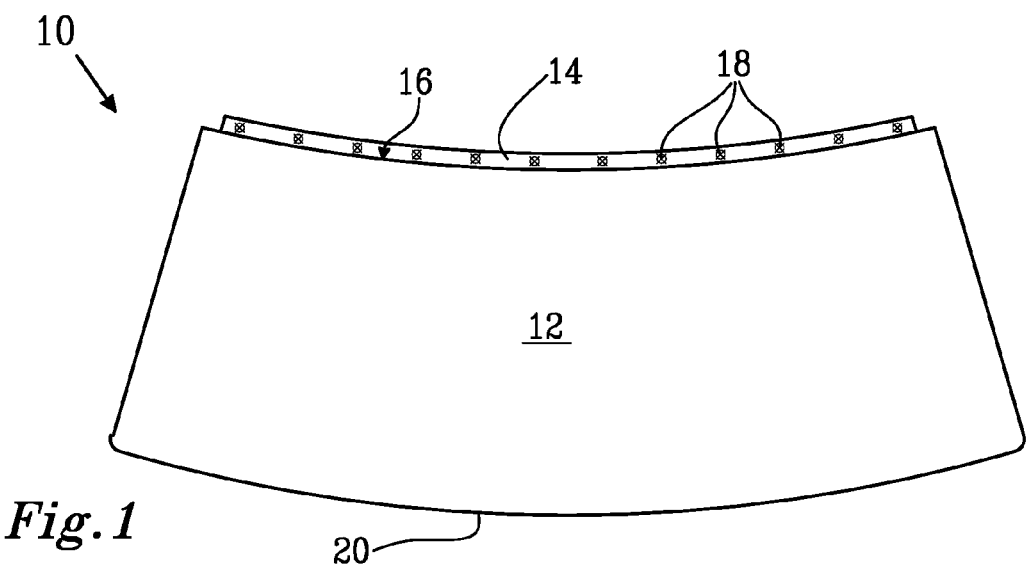
FIG. 1 shows a first embodiment of a window arrangement.

FIG. 1 schematically illustrates a first embodiment of a window arrangement 10 as disclosed herein, here exemplified by a windscreen of a vehicle. The window arrangement 10 comprises a window pane 12 and an illumination system, in the form of a light strip 14 extending along the first edge 16 of the window pane 12. The light strip 14 may extend along essentially the entire length of the first edge. Thereby the window pane is provided with a light, which is distributed lengthwise, preferably distributed in an even way.

The light strip 14 comprises a plurality of light emitting diodes (LEDs) 18. The LEDs 18 are red, blue and green, such that a wide spectrum of colors can be emitted by varying the intensity of the respective colors. Since the LEDs are located along the edge of the window pane 12, the window pane 12 will act as a light guide for the emitted light. By combining light from LEDs of at least two different colors at various levels for each of them the plurality of different colors is provided. As an example: if the first color may be chosen in n different intensity levels and the second in m different levels, n times m different combinations are selectable.

The window arrangement may be useful in a vehicle such as a car, bus, lorry, tram or train. It may also be used in a vessel or a building.

The illumination system may be fixedly attached to the window pane or it may be attached to a frame surrounding the window pane. The latter is appropriate if the window pane is openable, for example by lowering the window pane, since the illumination system in that case may remain in the frame which facilitates wiring for the supplying the illumination system with energy. Power for the illumination system may be supplied from the electrical system of the vehicle. As an alternative the illumination system may have its own source of energy.

Figure 2:
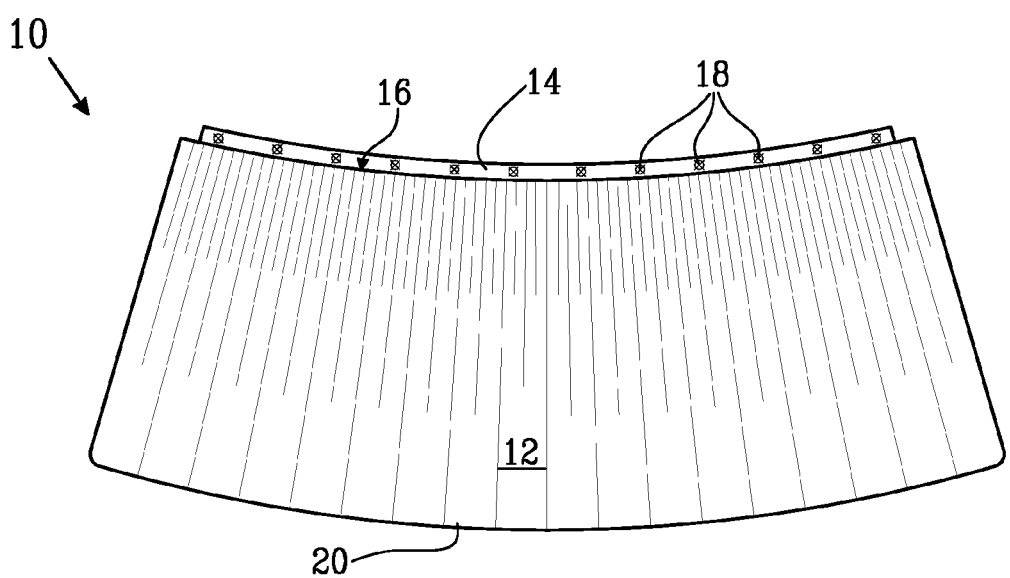
FIG. 2 shows a second embodiment of a window arrangement.

As shown in FIGS. 1 and 2, the first edge 16 is the upper edge of the window pane, when mounted in a vehicle. This means that the illumination system 14 is arranged along the upper edge, thereby being protected from water droplets falling onto the window pane, since these will follow gravity downwards. It would also be possible to arrange the illumination system along any other edge of the window pane, or along two or more edges.

The color may be selected in order to improve the visibility through the window. In certain weather conditions, for example in fog, the visibility may be improved by using a yellowish color for at least the windscreen. It is known for drivers of a vehicle to use yellowish spectacles. However, the visibility is improved if instead the whole window pane is colored, since if using spectacles the whole field of view is not covered, i.e. the person may look outside the spectacles when adjacent to the ends of his/her field of view. By having the color incorporated into the window arrangement, there is no need for using an extra pair of spectacles, which may easily be lost and may be difficult to find when most needed.

In addition, the illumination system may be used for sending information to other road users. In an emergency situation, for example at least the rear window may be illuminated by a warning color such as red or orange. The illumination may in such a case be flashing.

The plurality of colors comprises at least two colors, but in a preferred embodiment the number of possible colors is much higher, for example at least 10, at least 25 or at least 100.

With the window illumination system disclosed herein it is possible to change the color of the emitted light, thereby being able to select the color in a way adapted to the prevailing situation. The window arrangement as disclosed herein further makes it possible to combine the features of selecting a color for improved visibility with that for information purposes.

A driver and/or a passenger may select a preferred color and/or intensity of light. For example, if the driver or passenger determines that ambient light conditions in the environment outside the vehicle are such that their vision may be improved, they may select an illumination system setting that is expected to improve their vision. The selection may be made using a control device such as screen on the dashboard, the screen being a part of the infotainment system of the vehicle.

The selection of the color may, alternatively or additionally, be based on a sensor input, the sensor measuring a condition in the environment on the other side of the window pane, for example a rain sensor or a fog sensor.

The selection of the color may be coupled to an emergency system and/or safety system of the vehicle, for example illuminating the windows with red or orange color when the vehicle is braking hard. In this case, safety system may relate to an active safety system such as a collision warning system, etc. Furthermore, a means or arrangement for selecting one of the plurality of colors may be constituted of a warning system, an emergency system and/or an active safety system such as a collision warning system.

As an alternative, it may be possible to use only one kind of light source, for which it is possible to set a preferred frequency of the emitted light, i.e. to select a color, for example a tunable light source.

In an embodiment essentially the whole of the window pane is illuminable by the light. This gives a unitary impression of the selected color.

FIG. 2 schematically illustrates a second embodiment of a window arrangement 10 as disclosed herein when illuminated. The illumination system 14 is arranged in a way similar to that of FIG. 1. However, in a possible embodiment, the intensity of the light is chosen such that the light intensity gradually fades away with the distance from the illumination system 14. Therefore the upper part of the window pane 12 will have more color than the lower part. The light intensity at a second edge 20 of the window pane 12, the second edge 20 being opposite to the first edge 16, may be between 1% and 80% of the light intensity at the first edge 16, preferably between 5% and 75% and most preferably between 10% and 40%. The fading effect may also be selected by an operator, such as the driver of the vehicle. This may be advantageous when there is bright sunshine in the environment outside the vehicle or in order to avoid "dazzling" of the driver by other light sources in the environment.

Figure 3:
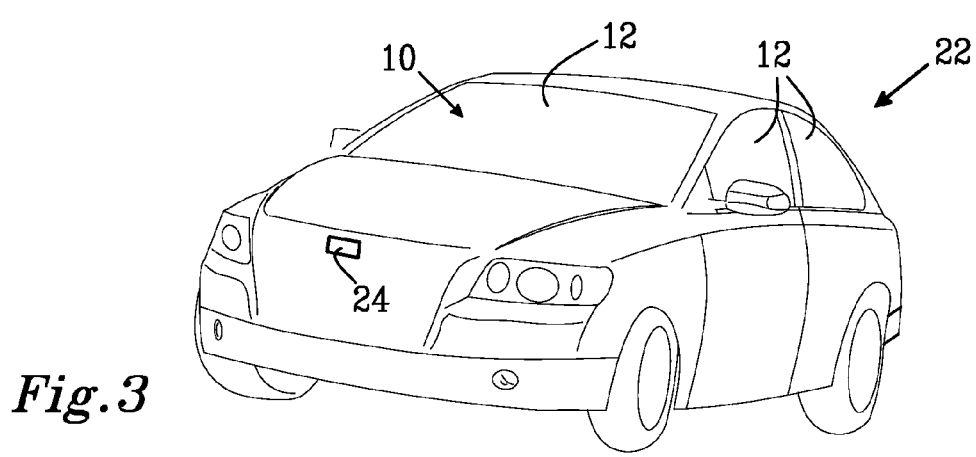
FIG. 3 is a schematic drawing of a vehicle as disclosed herein.

FIG. 3 is a schematic drawing of a vehicle 22 as disclosed herein. One, two or more of the windows 12 may be provided with the illumination system 10 described above. The window arrangement as disclosed herein is suitable for any window in the vehicle 22, in particular for the windscreen. In an embodiment all windows may be provided with such window arrangements.

The vehicle 22 may further comprise an environmental sensor 24, such as a rain sensor or a fog sensor, and the color and/or intensity of the light may be selected based on input from the environmental sensor.

The selected one of the plurality of colors may be adapted to enhance the visual contrast when viewing objects in the environment through the window. For example, under so-called "flat light" conditions (cloudy, foggy, or hazy) a yellowish color is known to improve visual contrast and overall visibility.

The colors displayed by the window may be selected to inform other road users, for example of a state of emergency. In that case an orange or a red color may be used.

The selected color may be adapted to reduce "dazzling" by bright lights directed toward the viewer. When driving in darkness, the headlight of approaching vehicles may dazzle the driver such that his/her sight is temporarily deteriorated. The color of the windscreen may be used to reduce this problem. A sensor, such as a camera, radar, lidar, or lux meter, may be used to detect approaching vehicles. In this case, it may be suitable to only illuminate a portion of the window pane.

The displayed color may be adapted to compensate for the color of external lighting source in the environment. It is common to use sodium vapor lights or mercury vapor light as street lighting since these are energy efficient. However, their emitted spectrum differs from that of daylight. Therefore human beings do not perceive colors in the same way as in daylight. However, with a window arrangement as disclosed herein the color of the window pane may be selected to compensate for this.

Further modifications of the invention within the scope of the appended claims are feasible. As such, the present invention should not be considered as limited by the embodiments and figures described herein. Rather, the full scope of the invention should be determined by the appended claims, with reference to the description and drawings.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of improving visibility for a person viewing an environment through a window comprising:
   detecting a light condition in the environment; and
   activating an illumination system adjacent an edge of the window in response to the light condition to direct light into the window, the light having an intensity and a wavelength to improve visibility.

2. The method of claim 1 wherein the light condition indicates a flat light condition.

3. The method of claim 1 wherein the light condition indicates bright sunshine.

4. The method of claim 1 wherein the light condition indicates a headlight of an approaching vehicle.

5. The method of claim 1 wherein the step of detecting a light condition in the environment comprises operating an environmental sensor and the illumination system is activated based on signals generated by the environmental sensor.

6. The method of claim 1 wherein the step of detecting a light condition in the environment is performed by the person viewing the environment.

7. The method of claim 1 wherein the intensity and wavelength of the light is selected to enhance visual contrast under the light condition.

8. The method of claim 1 further comprising:
   activating the illumination system to produce a color in the window that conveys information to at least one of the person viewing the environment and a second person located in the environment.

9. A method of operating an edge-mounted illumination system for a window comprising:
   detecting a light condition on an exterior side of the window; and
   activating the illumination system to produce a color in the window that provides improved visibility for a person viewing objects through the window.

10. The method of claim 9 wherein the step of detecting a light condition comprises operating an environmental sensor and the illumination system is activated based on signals generated by the environmental sensor.

11. The method of claim 9 wherein the light condition indicates a flat light condition.

12. The method of claim 9 wherein the light condition indicates bright sunshine.

13. A method of improving visibility for an occupant of a motor vehicle comprising:
    detecting a light condition outside the vehicle; and
    activating an illumination system adjacent an edge of a window to direct light into the window, the light being of an intensity and wavelength to produce a color in the window that improves visibility for the occupant when viewing objects through the window.

14. The method of claim 13 wherein the light condition indicates a flat light condition.

15. The method of claim 13 wherein the light condition indicates bright sunshine.

16. The method of claim 13 wherein the light condition indicates a headlight of an approaching vehicle.

17. The method of claim 13 wherein the step of detecting a light condition outside the vehicle comprises operating an environmental sensor and the illumination system is activated based on signals generated by the environmental sensor.

18. The method of claim 13 wherein the step of detecting a light condition outside the vehicle is performed by the occupant.

19. The method of claim 13 wherein the intensity and wavelength of the light is selected to enhance visual contrast under the light condition.

20. The method of claim 13 further comprising:
    activating the illumination system to produce a color in the window that conveys information to at least one of the occupant and a person outside the vehicle.

* * * * *